United States Patent
Armstrong

(10) Patent No.: US 8,805,781 B2
(45) Date of Patent: *Aug. 12, 2014

(54) DOCUMENT QUOTATION INDEXING SYSTEM AND METHOD

(75) Inventor: Orin Russell Armstrong, Becker, MN (US)

(73) Assignee: Geronimo Development, St. Cloud, MN (US)

( * ) Notice: Subject to any disclaimer, the term of this patent is extended or adjusted under 35 U.S.C. 154(b) by 367 days.

This patent is subject to a terminal disclaimer.

(21) Appl. No.: 11/153,594

(22) Filed: Jun. 15, 2005

(65) Prior Publication Data

US 2006/0287971 A1    Dec. 21, 2006

(51) Int. Cl.
 G06F 7/00    (2006.01)
 G06F 17/00   (2006.01)
 G06F 17/30   (2006.01)

(52) U.S. Cl.
 CPC .... G06F 17/30882 (2013.01); G06F 17/30728 (2013.01)
 USPC .......................................... 707/614; 707/634

(58) Field of Classification Search
 None
 See application file for complete search history.

(56) References Cited

U.S. PATENT DOCUMENTS

| 5,495,581 A | 2/1996 | Tsai |
| 5,594,897 A | 1/1997 | Goffman |
| 5,794,236 A | 8/1998 | Mehrle |
| 5,832,476 A | 11/1998 | Tada et al. |
| 5,870,770 A | 2/1999 | Wolfe |
| 5,940,800 A | 8/1999 | Bennett et al. |
| 5,950,214 A | 9/1999 | Rivette et al. |
| 5,987,454 A * | 11/1999 | Hobbs .................................. 1/1 |
| 6,038,574 A | 3/2000 | Pitkow |
| 6,256,631 B1 | 7/2001 | Malcolm |
| 6,263,351 B1 * | 7/2001 | Wolfe ............................ 715/236 |
| 6,289,342 B1 | 9/2001 | Lawrence |
| 6,317,741 B1 * | 11/2001 | Burrows ............................... 1/1 |
| 6,356,922 B1 | 3/2002 | Schilit et al. |
| 6,370,551 B1 | 4/2002 | Golovchinsky et al. |
| 6,601,061 B1 * | 7/2003 | Holt et al. ........................... 1/1 |
| 6,718,518 B1 * | 4/2004 | Plow et al. ..................... 715/205 |

(Continued)

FOREIGN PATENT DOCUMENTS

JP    61300566    6/1988

OTHER PUBLICATIONS

Geronimo Development Corporation; Casefinder User's Manual, 2000-2001.
Aug. 17, 2011 Office Action, U.S. Appl. No. 12/383,674.

(Continued)

*Primary Examiner* — Daniel Kuddus
(74) *Attorney, Agent, or Firm* — Beck & Tysver, PLLC

(57) ABSTRACT

A computerized system and method is presented for analyzing quotations made in a quoting document of text originally found in a source document. The present invention analyzes the quoting document for quoted text, searches the source document for that text, and stores the existence of the quotation in association with the source document. When displaying the source document, a list of text items that were quoted by another document is presented sorted by frequency of quotation. Quoted text is also highlighted when the original text of the source document is displayed. Hyperlinking is allowed between items of quoted text by the user and a list of documents that have quoted that text. From this list the full text of a quoting document may be displayed. The frequency of quotations taken from a source document can also be used to rank documents in search results.

33 Claims, 5 Drawing Sheets

(56) References Cited

U.S. PATENT DOCUMENTS

| | | | |
|---|---|---|---|
| 6,732,030 B2* | 5/2004 | Jones | 701/33.2 |
| 6,732,090 B2* | 5/2004 | Shanahan et al. | 707/3 |
| 6,963,869 B2 | 11/2005 | Burrows | |
| 6,983,282 B2 | 1/2006 | Stern et al. | |
| 7,003,719 B1* | 2/2006 | Rosenoff et al. | 715/205 |
| 7,028,259 B1* | 4/2006 | Jacobson | 715/236 |
| 7,246,310 B1* | 7/2007 | Wolfe | 715/236 |
| 7,529,756 B1* | 5/2009 | Haschart et al. | 1/1 |
| 7,882,115 B2 | 2/2011 | Hirsch | |
| 2002/0089533 A1* | 7/2002 | Hollaar et al. | 345/738 |
| 2003/0046277 A1* | 3/2003 | Jackson et al. | 707/3 |
| 2005/0234893 A1 | 10/2005 | Hirsch | |
| 2006/0190812 A1* | 8/2006 | Ellenby et al. | 715/512 |

OTHER PUBLICATIONS

Jan. 17, 2012 Response to Office Action, U.S. Appl. No. 12/383,674.

Nelson, Theodor Holm, "Xanalogical Structure, Needed Now More than Ever: Parallel Documents. Deep Links to Content, Deep Versioning, and Deep Re-Use", 1999, ACM, vol. 31, pp. 1-32.

Aug. 1, 2013 USPTO Office Action (U.S. Appl. No. 12/383,674)—Our Matter 4312.

* cited by examiner

DOCUMENT QUOTATION INDEXING SYSTEM AND METHOD

FIELD OF THE INVENTION

The present invention relates generally to full-text indexing software. More specifically, the present invention relates to software that identifies text in a first document that is quoted in a later document, and both displays information about the quoted text when displaying the first document and uses quotation data in determining a "value" for the quoted document during document searching

BACKGROUND OF THE INVENTION

The core function of text-search-and-retrieval software is to find those documents in a set that contain the items specified in a query. Having found the documents that match a query, however, existing text-search-and-retrieval systems are poor at determining which of the found documents have "meaning" to the user. Various methods of "ranking" are touted by existing text-search-and-retrieval software, such as counting the number of times a particular word appears in a document, or by attaching more "weight" to unique terms. But such methods rely upon statistics, rather than the logical connotation of the words in the documents.

This inability to rank text-based search results adequately is particularly troubling in the legal research field. If traditional legal research is viewed as proceeding "from the top down," computerized legal research proceeds "from the bottom up." In traditional research, the attorney first consults legal encyclopedias and digests to find discussions of general legal topics, then hones the research to more discrete areas, hoping that the digest authors will provide citations to case law that they have deemed relevant. Using computerized legal research, the attorney enters a Boolean search expression that he thinks will generate cases that are relevant to the research topic, and retrieves the full text of every document that matches his search expression. However, unlike finding the same documents via traditional legal research, wherein the authors of encyclopedias and digests have only listed cases which the authors have evaluated and found valuable, existing search and retrieval software does not provide the researcher with any content-based evaluation of the found documents.

One method of "valuing" legal documents found in a search is to evaluate the citations made to these documents. American jurisprudence relies upon precedent. Judges must base their decisions upon principles set out in earlier cases, and must provide precise citations to the earlier decisions upon which they are relying. Consequently, prior art legal search engines have analyzed these citations in order to value documents and to rank search results. For instance, the CaseFinder service provided by the assignee of the present invention displays citations to other cases as hyperlinks, where one click takes the user to the text of the cited case. CaseFinder uses this hyperlinking capability to provide a better search result ranking mechanism. The extent to which a document has been cited by later documents enhances the "value" of that document.

CaseFinder shows the user a list of later cases that cite the found document. CaseFinder can arrange the documents in the list by using two kinds of relevance ranking that rely upon citations. In the first type, CaseFinder ranks documents according to the number of times they had been cited by other documents. The second type of ranking is similar, but in this instance, CaseFinder first assigns a "weight" to a citing document by determining how many times it had been cited. CaseFinder then uses the calculated weight of the citing documents, rather than a simple count of the citing documents, to rank the cited document. Unfortunately, even the CaseFinder system does not provide a perfect ranking system for legal text searchers.

In addition to the issue of ranking documents that are found by a search, prior art search engines and prior art techniques lack other important aids to legal researches. For instance, attorneys performing research may come upon a phrase in a document that seems to be of particular importance to the research task. The researcher may wish to incorporate the phrase by quoting it, or by incorporating the meaning of the phrase in his or her report. However, for the report to be credible, it is important for the researcher to know if others in the field have deemed the phrase significant. Currently, there is no method or device for rapidly making such determinations.

One method of accomplishing this is to examine later documents for quotations of material from an earlier (or "source") document. The quotation of material from an earlier work evidences the judgment of the author of a later work that the quoted words, and/or the work that contains them, are significant. By locating and displaying words and phrases in an earlier work that have been quoted by subsequent works, and by revealing the identity of the subsequent works, the invention assists researchers in determining the value of particular words and phrases in earlier documents.

When a later decision quotes language from an earlier decision, the act of quotation itself constitutes a value judgment resulting from intellectual analysis. However, no existing digital research system recognizes the significance of quotations. What is needed is a text-based indexing and searching system that recognizes, as an indicator of the value of a source document, the fact that items of text in the source document were included as quotations by a later document.

SUMMARY OF THE INVENTION

By utilizing the existence and frequency of quotations within the document set, the present invention provides enhanced ranking capabilities. Furthermore, by listing those items of text within a document that have been quoted by other documents, an important indicator relating to the content of the document can be created using only a minimal amount of human effort. This is accomplished by examining text documents for quotations of material from other documents. When a quotation is identified, the document from which it was quoted is located, and the presence of the quoted material within that document is confirmed. The presence of the quotation is then stored in association with the quoted document, along with the number of times the item of text was quoted in the quoting document. This allows easy identification of all sources that have quoted a document.

When displaying a document, the present invention can display a list setting forth the items of text that were quoted by one or more other documents. This list may also display the number of documents quoting each such item of text and the total number of times each such item of text was quoted by all other documents. This list can be sorted to present the most frequently quoted items of text at the top of the list. This sorting can be by the number of documents quoting each item of text or the total number of times each such item of text was quoted by later documents. In addition, the text of documents can be displayed such that all items that have been quoted by another document are highlighted. This highlighting can take place by changing the color of the displayed font, creating a different colored background for that text, or otherwise visually emphasizing the importance of the text. Upon the selection of an item of quoted text by the user (either from the list or from the highlighted text within the document), the present invention displays a list of documents that have quoted that item of text. From this list the full text of a selected quoting document may be displayed.

The items of text quoted from a document can be used by the present invention to determine a "value" for the document being quoted. If a document has been quoted more times than another document, or if it has been quoted by a larger number of documents, it can be considered to have a higher value. This valuation can then be used to rank search results from a user's Boolean search. In addition, the presence of a word from a user's search query within an item of quoted text may give that document a higher value. Alternatively, it would be possible to restrict a user search to only text that has been quoted by other documents.

DETAILED DESCRIPTION OF THE INVENTION

Overview of the System

Data relating to the items of quoted text in a document can be recorded in any of several methods well recognized in the art, all of which enable the data to be retrieved as needed by the research system. Three such methods of data storage are utilized in the preferred embodiment of the present invention.

Figure 1:
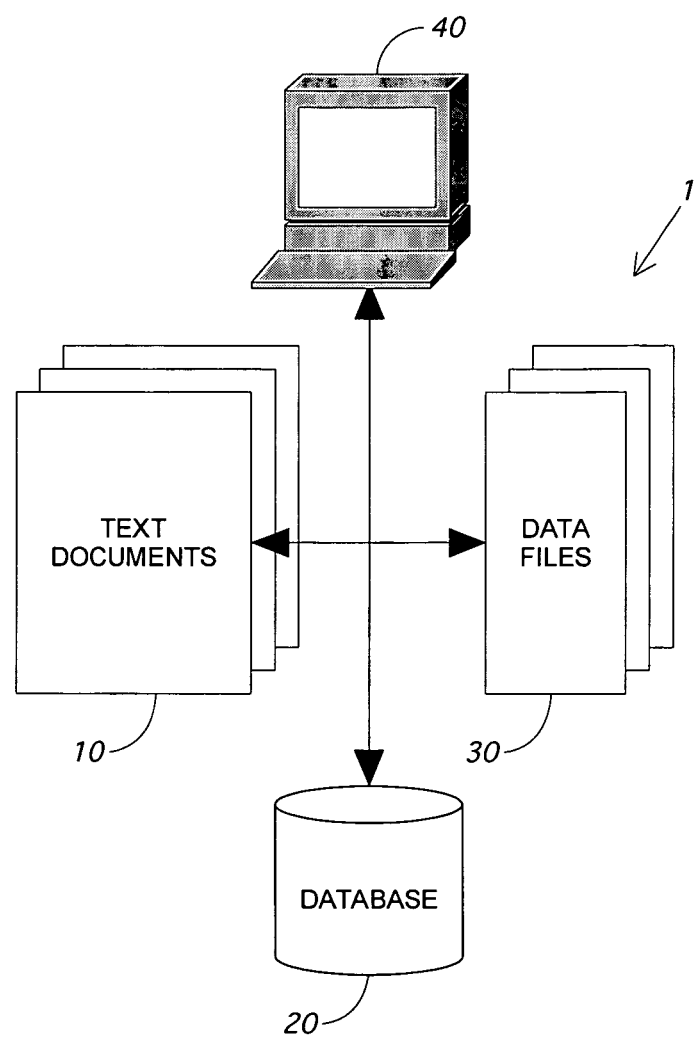
FIG. 1 is a schematic diagram showing the major elements of the present invention.

As shown in FIG. 1, the present invention system 1 is designed to function with a set of text documents 10 in which some documents in the set quote text from other documents in the set. All documents 10 are contained in computer-readable text files, and information about each document and its text file is contained in a relational database 20. In addition, each of the document text files 10 has a data file 30 associated with it. The invention is comprised of modification programs operating on one or more general-purpose computers 40 that modify the text files 10, and modify information in the database 20 and the data files 30. The computer software further includes a document viewer program with added functionality that displays the text files 10. The document viewer software can operate on the same general-purpose computer 40 as the modification software. However, in the preferred embodiment, the viewer software forms part of the end-user software distributed to users of the system 1, while the modification software is operated as part of a centralized, data management system that creates and establishes the text documents 10, the database 20, and the data files 30. When distributed to the end user, the viewer software has access to the text documents 10 and the data files 30, but not to the database 20.

The text document files 10 preferably employ a format similar to HTML, in which "tags" delineated by "pointy brackets" ("<" and ">") contain information in the form of text. Neither the tag delimiters, nor the information within them, are shown when the document is displayed to an end user. The information within the tag is used by the document viewer for a variety of purposes, such as formatting instructions for all or part of the text of the document. The information may concern the document itself, such as its name, citation, author, date, etc. Tags may contain hyperlinks, which identify another file to be opened and displayed. Specifically relating to the invention, tags in source text documents 10 will mark the beginning and end of text that has been quoted in other documents 10, and provide a unique identifier for the quoted material. This identifier need only be unique to a particular document, although it would be within the scope of the present invention to make the identifier globally unique. Tags in quoting text documents 10 will mark the beginning and end of the quotation, identify the source of the quoted material and disclose the unique identifier assigned to the quoted material in the source document.

Alternative ways for identifying items of quoted text in a source document would be clear to those of ordinary skill and are within the scope of the present invention. For instance, rather than placing tags directly around the item of quoted text, it would be possible to identify the location of the quoted text by calculating the offset position of the quoted text from a known position in the source document. For example, text within a document may be identified by a character count starting at the beginning of the document. Thus, rather than directly tagging the item of quoted text, a data construct can be used that indicates that the item of quoted text starts at a first character position and ends at a second character position. This data construct can be a meta-data tag within the source text document 10. Alternatively, the data construct could be external to the text document, such as in a data file 30 or an external database 20. Regardless of its location, the data construct can contain not only the location of the item of quoted text, but also the unique identifier associated with the quoted material. Similar data constructs can be used to identify quotations and source documents in quoting text documents 10.

The present invention uses two ways to identify each document 10 in the system: the citation, and the filename/document number. The document's citation is the formal identity of the document. For a scholarly article, the citation might be the volume number, the journal name, and the page number for the beginning of the article. For a legal opinion, the citation would include the volume number, the reporter name (or its abbreviation), and the page number of the beginning of the opinion. The filename is the name of the physical file containing the text document 10. In the preferred embodiment, each text document 10 and each data file 30 is stored in a separate file maintained by a standard, computerized file system. The text documents 10 and the data files 30 use identical names with differing extensions. The preferred embodiment uses filenames that consist of a six-character mnemonic that identifies the jurisdiction that issued the document, followed by a unique six-digit number for each document in that jurisdiction. This provides a capacity of one million documents in each jurisdiction. Of course, it would be a simple matter to use a nine-digit number for each document in a jurisdiction, allowing a billion documents per jurisdiction. It would also be possible to use more characters in the mnemonic, to enable the system to handle more jurisdictions or to make the mnemonic more "readable." The text document files 10 then add a "gml" extension. For example, "va_scp000001.gml" could contain the formatted text of a published decision of the Virginia Supreme Court. The related data file 30 bears the same primary file name as the document file 10, but with a different extension. Thus, the data file 30 "va_scp00001.qtd" contains information regarding the text document found in file "va_scp000001.gml", and preferably is found within the same encompassing folder used by the file system. The ".qtd" data file 30 contains information about the documents 10 in the system that cite or quote the document in its related ".gmln" file. More specifically, the data file discloses, inter alia, the total number of citations, data about each citation, the total number of quotations, and data about each quotation. Whenever the document viewer opens a text file, it need only use the same file number with a different extension to open the associated data file.

The data file 30 contains "records" for each of the other documents 10 in the system 1 (the "quoting document") that cite or quote the document 10 having the same basic filename as the data file 30 (the "source document"). The layout of the records in the preferred embodiment of the data file 30 is as follows:

va_cap055213|Clay v. Commonwealth|33 Va. App. 963|4|97,2; 198,1|2|2,1;7,1

Each record relates to a single document that quotes or cites the source document 10. The record has a total of seven fields, which are divided by the vertical bars. The first field is this quoting document's filename, while the second and third fields contain the quoting document's title and its citation. The fourth field indicates the total number of citations made by this quoting document to the source document. The fifth field identifies "pinpoint" citations by this quoting document to the source document. A pinpoint citation is one that refers to a specific page or pages within a case, or to a sub-section of a statute as is described in more detail below. Field five can identify multiple pinpoint citations, as this quoting document may cite the source document numerous times. Each pinpoint citation in field five contains a page number, a comma (or other delimiter), and the number of times that page or sub-section in the source document was cited by this quoting document. A semi-colon (or other delimiter) separates multiple pinpoint citations in field five. Field four may indicate more total cites than the number of pinpoint cites that are listed in field five, since not all citations are pinpoint citations. Field six indicates the number of times this quoting document has quoted the source document. Field seven identifies the quotations made by this quoting document from the source document. As with field five, semi-colons separate multiple quotations identified in field seven. Each quotation contains the unique identifier number assigned to the item of quoted text in the source document, a comma, and the number of times that item of text was quoted by this quoting document.

In addition to the text documents 10 and data files 30, document-related data is also contained in the relational database 20. This database 20 is used during the data recordation or modification phase to automate some of the steps, such as returning the name and location of a file containing a particular document 10 when given the citation to that document. The database 20 associates every text document 10 in the system 1 with a unique document number, which in the preferred embodiment is the same as the primary file name of the text document 10 and the data file 30 (such as "va_scp000001").

Figure 2:
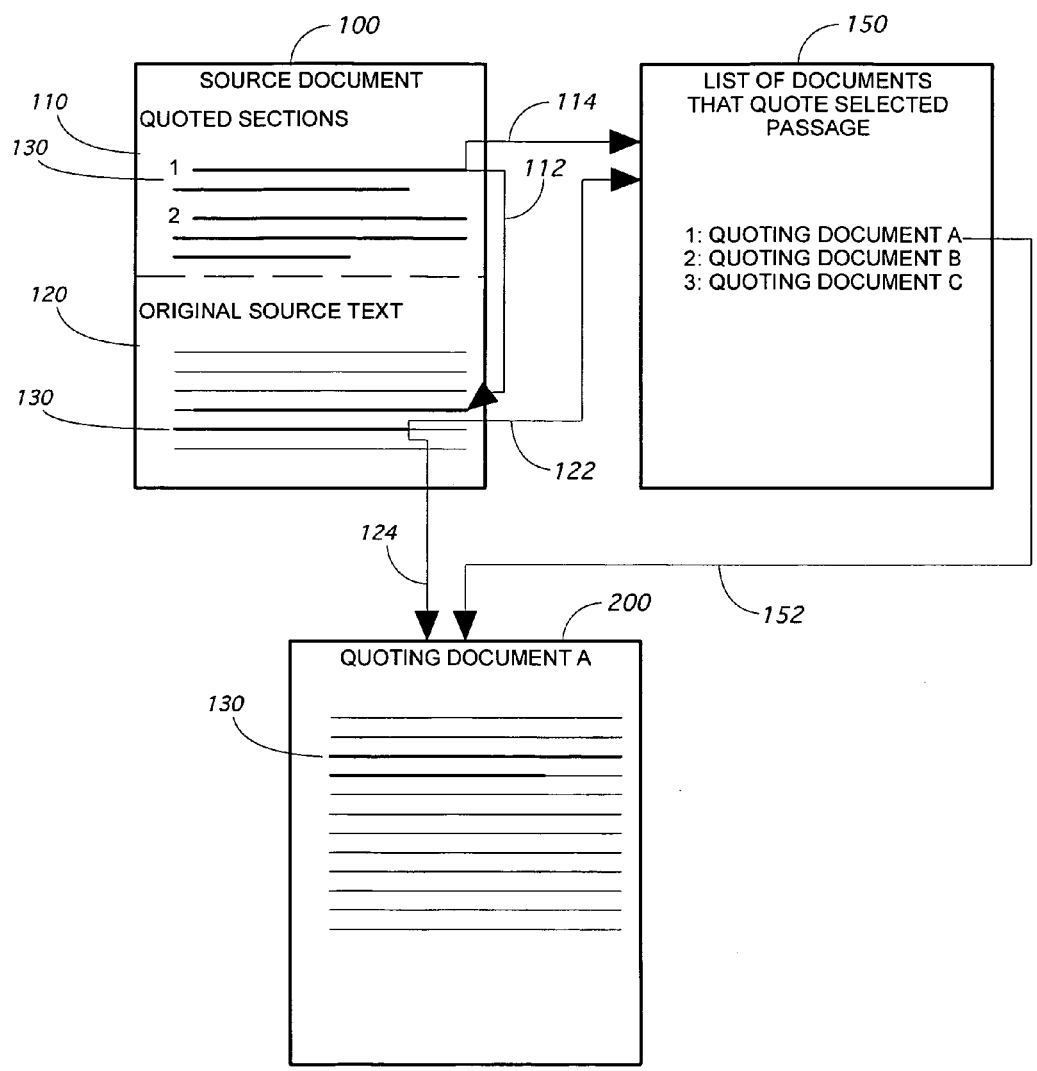
FIG. 2 is a schematic diagram showing the elements of the present invention experienced by an end user.

FIG. 2 shows how an end user would experience the present invention. The end user starts by viewing a source document 100 containing text that is of interest to the user. For instance, an attorney may wish to view the text of a legal opinion. The source document 100 is presented in two parts: (1) a list of items of text 110 that other documents have quoted from the source document 100 and (2) the original source text 120. In the preferred embodiment, items of text in the original source text 120 that have been quoted by another document in the system 1 will be highlighted in a color of the user's choosing or otherwise emphasized graphically. In the preferred embodiment the viewing software creates this view of the source document 100 using information found in the tags in the text document 10.

The list 110 of items of quoted text preferably precedes the source text 120, and the items of quoted text in the list 110 serve as a form of "headnotes." Headnotes are single paragraph analyses of the legal principles discussed in the case. Traditional headnotes are created manually by a trained attorney, and are therefore expensive and time-consuming to prepare. The present invention reveals those portions of a case which subsequent authors in the legal community have deemed of such significance as to be worthy of quotation. Displaying such items of quoted text at the beginning of the document approximates the function of headnotes, but does so rapidly and at nominal cost, as the processing required by the invention needs minimal human input or oversight. In addition, the list 110 of items of quoted text is dynamic, changing each time a new document 10 is analyzed that quotes from the source document 10. It can be seen that headnotes are "prospective"; they presume to say what is important about the case before the attorney population in general has had a chance to make that determination for themselves. In contrast, quotes are retrospective; after the case has been available for a while, attorneys and judges may have quoted items of text which they deem especially valuable—which may not be the same as what the headnote writers had thought.

The list 110 of items of quoted text can be hyperlinked (or otherwise linked) in one of two ways. For instance, a user could select one of the items of quoted text 130 and link directly to the place in the original source text 120 where the quoted text 130 is found. This hyperlink is shown in FIG. 2 by arrow 112. Alternatively, the user could link directly from the quote 130 to a list 150 that identifies all documents that have quoted the selected item of quoted text. This hyperlink is shown as arrow 114. It is also possible for the user to follow link 122 from the quoted text 130 as highlighted in the original source text 120 to the list of quoting documents 150.

These various links can be accessed in traditional ways well known in the prior art, such as by clicking on the text using a mouse or similar device. Where two possible destinations are shown in FIG. 2, such as with links 112 and 114, the end user could be presented with separate "buttons" or other interface devices to allow immediate selection of either link. Alternatively, the system 1 could present a contextual menu whenever the user selects an item of quoted text 130, with the contextual menu presenting the user with a list of possible hyperlink destinations. These are just a few of the known interface devices that could be used to select the hyperlinks of FIG. 2. These links can be formatted as standard hyperlinks that can be accessed by any standard web browser. Alternatively, the functionality of the hyperlinks could be implemented within the executable of the viewer software used by the end user. In other words, the viewer software that presents the user interface of FIG. 2 can be a web server that creates HTML that can be understood by any standard web browser, or the viewer software can be a customized executable that directly interprets documents 10 and data files 30 for the benefit of an end user.

From the list 150, it is possible for the user to select an individual document and follow link 152 directly to the quoting document 200. In the preferred embodiment, the quoting document 200 is opened directly at the location where the item of quoted text 130 is found. In most cases, the quoting document 200 would contain a citation to the original source document 100. It is already known in the prior art to create a hyperlink (not shown) based on that citation directly back to the quoting document 100. However, the present invention has an additional hyperlink 202 related directly to the item of quoted text 130. By following this link, the end user can open the source document 100 directly at the location of the quoted text 130 in the original source text 120.

In one embodiment of the invention, a link 124 is also established from the quoted text 130 in the original source text 120 to the quoting document 200. When the user requests a contextual menu for a particular word in the original source text 120, the menu will include a list of all cases having quotations that include the selected word. From the list, the selected quoting document 200 can be displayed, optionally scrolled to the place in the document 200 where the quote 130 appears. Ideally, the system 1 will highlight the quotation 130 in the quoting document 200 in an alternate color or in some other distinguishing format.

The presence of text in a document that has been quoted by other documents is an indicator that other documents placed a high value on the quoted document. This value can be used in a variety of ways to improve the quality of results obtained by a user query of the text documents 10. First, since it is a simple matter to determine the number of times all quoting documents 150 quote a source document 100, this count can used to develop a score or value for the source document 100. This count is a good indicator of the importance placed upon that source document 100 by the authors of the other text files 10. This score can be used to rank text files 10 relative to one another, which is especially useful when multiple text files 10 are found in the same search result set after a user has executed a content search of the text documents 10. In this aspect of the present invention, the search software analyzes the count of quotations for each document 10 found in the search result set, and sorts the results based on this count. Alternatively, it is possible to compare a user's search query to the identified items of quoted text in every document returned by the user query. When a word in the query falls within an item of quoted text for a particular found document, this indicates that the author of another document quoted the found document for text similar to the user's search query. In this case, additional value may be imparted to the found document, which may be used to sort the search results. A third option is to create a separate database by extracting and indexing the "tagged" quotations from all documents. This would enable the user to perform a search limited only to the text in the documents 10 that have been quoted by other documents 10.

Document Markup

Figure 3:
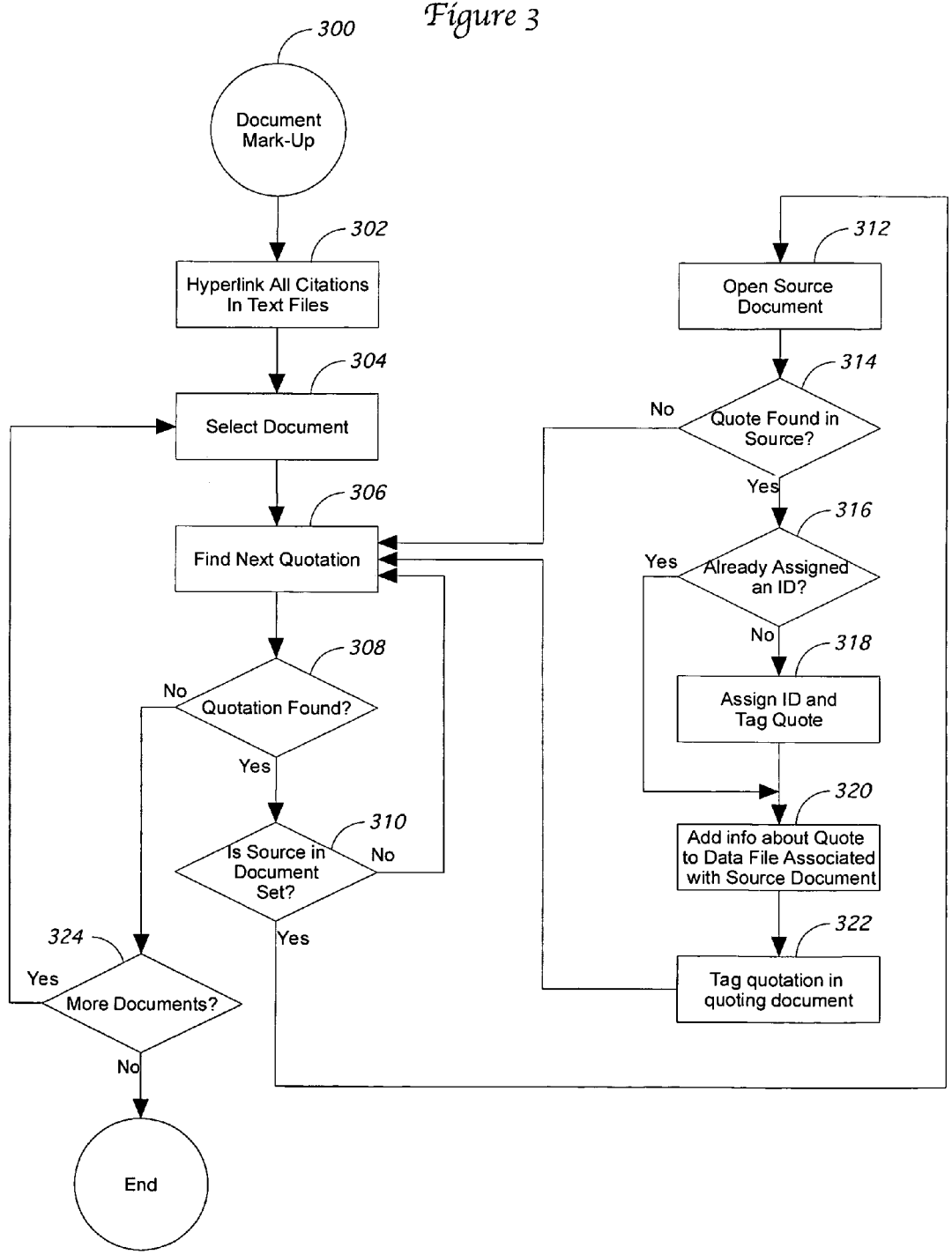
FIG. 3 is a flow chart showing the document mark-up process used by the present invention.

It is necessary to preprocess the text files 10, database 20, and data files 30 in order to create and/or present the list 110 of items of quoted text, hyperlinks 112, 114, 122, 124, 152, and 200 and the list of quoting documents 150. The basic steps for accomplishing this function are shown in the flow chart 300 of FIG. 3.

In step 302, all the text files 10 in the system 1 are hyperlinked. This means that each citation to another document in the set is linked to the text file 10 representing the cited document. In the preferred embodiment, each quotation of text from another document should be accompanied by a citation to that document, and that citation will be hyperlinked in this step 302. The process for hyperlinking in step 302 is explained below in connection with FIG. 4, and includes the steps of creating or modifying a data file 30 for each document 10. The data file 30 will contain a record for each document that cites the document to which the data file belongs. This hyperlinking step 302 can batch process all documents 10 in the system 1, or can add the necessary hyperlinks whenever a new document 10 is added to the system 1.

In step 304, a text file 10 containing a document is selected and opened by one of the computer programs comprising the invention. The document is examined for quotations in step 306 by searching for material contained within double or single quotation marks. In the preferred embodiment, this step is made easier by first converting all quotation marks in the document 10, including both single and double quotation marks, to "smart" quotation marks. In addition, text whose formatting designates it as a quotation, such as an indented paragraph, is also recognized as a quotation. This system can also be programmed to ignore all quotations containing less than a specified number of words, or to ignore other text material as instructed by the user.

If step 308 discovers a quotation, step 310 determines whether the source document containing the quoted material is found in the text documents 10 that form the document set being handled by the present invention. To accomplish step 310, the citation of the source document 100 is determined by examining the text surrounding the quotation for citation hyperlinks created in step 302. While in some circumstances this process could be fully automated, the preferred embodiment presents to an administrator one or more possible citations for the quotation, and asks the administrator to select the correct citation. The possible citations presented to the administrator will include all citations found in the current and all previous paragraphs of the quoting document. This enables the administrator to ensure that the quotation is from another document 100 within the document set 10, rather than from a document not within the document set 10. For each quotation, the administrator can instruct the system to process the quotation using the selected citation, ignore the quotation this one time, or ignore this and all subsequent instances of the quotation in the quoting document. The administrator is also allowed to manually create a new hyperlink to a source document 100. Though rare, this situation could arise when a citation is not discovered in step 302, such as when a legal case is cited only by its popular name (such as Miranda).

Using the selected citation, process 300 opens the text file 10 containing the source document 100 in step 312. The text of the source document is then examined for the quoted material in step 314. Algorithms in the present invention permit the searching process to handle some discrepancies between the quotation in the quoting document and the quoted material in the source document, such as ellipses or editorial upper- and lower-casing. The present invention is able to determine if there is a match in step 314, automatically finding exact matches and matches including only minor variations between the quotation and the source document. If an exact or nearly-exact match cannot be made automatically, the administrator is asked to locate the quoted text. To assist the administrator, the system attempts to make a partial match to the quotation, such as by searching for the first two words of the quotation. Once this is found, additional words and characters in the quotation are examined until a point of mismatch is discovered. At this point, the preferred embodiment seeks input from an administrator to verify the match. The invention displays that portion of the source document that contains the partial match, with the matching text highlighted. The administrator then determines whether the highlighted material in the source document constitutes the material that was quoted by the author of the quoting document. The administrator can highlight additional material in the quoted document as necessary to identify the text that was (or was intended to be) quoted. The administrator is also given the option to search for the next partial match. In most instances, the citation to the source document is a pinpoint citation, allowing the system to focus on the cited pages for the matching text. However, authors are known for including incorrect pages in their citations, so the present invention is capable of searching the entire source document for the quoted text.

If step 314 finds the quoted material in the source document 100, whether automatically or with administrator assistance, the characters immediately preceding and following the quoted material in the source document 100 are examined to see if the quoted material has been previously assigned a unique identifier in step 316. In the preferred embodiment, the unique identifier is an integer assigned to each item of quoted text in the source document 100 that has been quoted by one or more quoting documents 200. The present invention brackets the item of quoted text in the source document with tags that identify it as quoted text and contain a unique identifier for that item of quoted text. In the preferred embodiment, a tag in the form "<qs Q>" marks the beginning, and a "</qs Q>" tag marks the end of the quoted material (where "Q" is the unique identifier assigned to the item of quoted text). There are many alternative methods, well-known in the art, which can be used to store the information regarding the identifier and the beginning and end of the quoted material, either within the document file or in a separate file or database. If another document quoting the same material had been identifier previously, then the tags will already be present and a unique identifier will already have been assigned to the quoted material. In this case, there is no need to assign a unique ID or add tags to identify the quotation, and step 316 continues processing at step 320. If the quotation has not been previously tagged, step 318 assigns a unique identifier and tags the item of quoted text in the source document 100.

The tags of the present invention are able to effectively handle "nested" quotations. For example, document A could contain the following statement: "Birds sing. Dogs bark. Cats meow. Fish bubble. Cows moo." Document B may quote only a portion of this thought: "Dogs bark. Cats meow. Fish bubble." This portion would be assigned unique identifier number 1. Document C may only quote "Cats meow" (unique identifier number 2) and document D may quote only "Cats meow. Fish bubble." (unique identifier number 3). The text in document A would be tagged as follows:

---
Birds sing. <qs 1>Dogs bark. <qs 3><qs 2>Cats meow.</qs 2>
Fish bubble.</qs 3></qs 1> Cows moo.

---

In step 320, the data file 30 associated with the source document 100 is opened and altered. More specifically, the data file 30 will contain a record for every document that cites the source document 100, including the quoting document 200. These records were created as part of the hyperlinking step 302. Step 320 involves locating the record in data file 30 for the quoting document and adding information about the quote to that record. In the preferred embodiment described above, the seventh field of the record contains the unique identifier of the quoted material and how many times such material was quoted by the quoting case.

Next, in step 322, tags are inserted at the beginning and end of the quotation in the quoting document 200. These tags include the filename of the source document and the unique identifier assigned to the quoted material in the source document, and would be in the form of "<qt [filename]#Q>" to mark the beginning of the quote and "</qt [filename]#Q>" to mark the end. As an example, if the quotation were assigned unique identifier number 1 and were found in filename va_scp000001.gml (with the data file 30 found at va_scp000001.qtd), the quotation would be marked as follows:

<qt va_scp000001#1>(quotation)</qt va_scp000001#1>

It would also be possible to use other techniques to identify the location and source of the quotation in the quoting documents 200. For instance, the information could be stored elsewhere within the quoting document 200 or in a separate file (like a data file 30) or in database 20.

After the tags are inserted in step 322, or after step 310 or 314 discover that the current quotation is not found in the documents 10 in system 1, steps 306 and 308 determine whether additional quotations are found in the current document. If so, step 310 begins processing the next quotation. If not, step 324 analyzes whether any additional documents are to be processed. If so, step 304 selects the next document to be analyzed. If not, the process 300 ends.

The above process 300 can be better understood in the context of an example quotation. Assume that Smith v. Jones, 260 Va. 324 (file number va_scp034688) quotes the phrase "The law is a seamless web," citing page 71 of the earlier case of Watertown v. Braxton, 221 Va. 68 (file number va_scp032451). The Smith case is opened in step 304 and the system discovers the quotation in steps 306 and 308. The system highlights the quotation and presents it to an administrator, who instructs the system to process the quote. Alternatively, in the case of an exact match, the administrator verification could be skipped. The pin-point citation to 221 Va. at 71 is discovered, and optionally presented to the administrator with a list of all possible citations. More particularly, the present invention will display to the administrator a list of all citations in Smith that had been hyperlinked up to and including the paragraph containing the quote. Our quick-witted administrator selects Watertown from the list and instructs the system to continue at step 310. The system finds ands opens the source document—va_scp032451.gml—at step 312, and automatically searches page 71 for the words "The law is a seamless web". Upon finding it at step 314, the system determines that the quoted material had not been previously tagged at step 316 and then determines that the next available unique identifier for materials quoted from Watertown is number 13 (step 318). The system then inserts a "<qs 13>" tag before, and a "</qs 13>" tag following, the phrase "The law is a seamless web" on page 71 of Watertown. At step 320, the system also opens va_scp032451.qtd, the data file 30 associated with the Watertown file, and examines the first element of all records to find a match for va_scp034688, the file number of the Smith case. Finding the record created during the hyperlinking step 302, the quotelinker adds "13,1" in the seventh field of this record in the data file, and increments the total number of quotations (of Watertown by Smith) in field six.

va_scp034688|Smith v. Jones|260 Va. 324|1|71,1|1|13,1

This record indicates that the Watertown case is cited by and quoted by va_scp034588, also known as Smith v. Jones, 260 Va. 324. The citation is to page 71, and Watertown is cited once by Smith. The item of quoted text in Smith was assigned unique identifier number 13 in Watertown, and is quoted once by Smith. Returning to the file of the Smith case, the system at step 322 then inserts a "<qt va_scp032451#13>" tag before, and a "</qt va_scp032451#13>" tag after "The law is a seamless web" where it occurs in the text of Smith.

In an alternative embodiment, the total number of times an item of text had been quoted by other documents could be placed within the opening <qs> tag within the text file 10. The viewing software could then determine the number of times the item has been quoted without consulting the data file 30. This means that the viewing software would not have to open the data file 30 in order to create the view of the source document 100 shown in FIG. 2. In this alternative embodiment, information as to the documents that have cited to or quoted material from the current text document 10 would remain in the data file 30, meaning that data file 30 would still be accessed in order to create document list 150. It would also be within the scope of the present invention to place this type of information directly within the tags found in the text documents 10, effectively merging the information in data files 30 into the text files 10. This information could be placed within the quotation tags, or more preferably could be placed with other meta data at the beginning or end of the text file 10.

Details of Hyperlinking Process

When a text file 10 containing a document is to be added to the system 1, the present invention creates a record for that file in a master database 20. In the record for that file, the citation of the document is stored in the "citations" field, the filename is stored in the "filename" field, and if the document is a court opinion, the last page number in the opinion is obtained from the text file and stored in a "last page" field. There are additional fields in the record. Consequently, this information is available in database 20 for all documents 10 in system 1.

Figure 4:
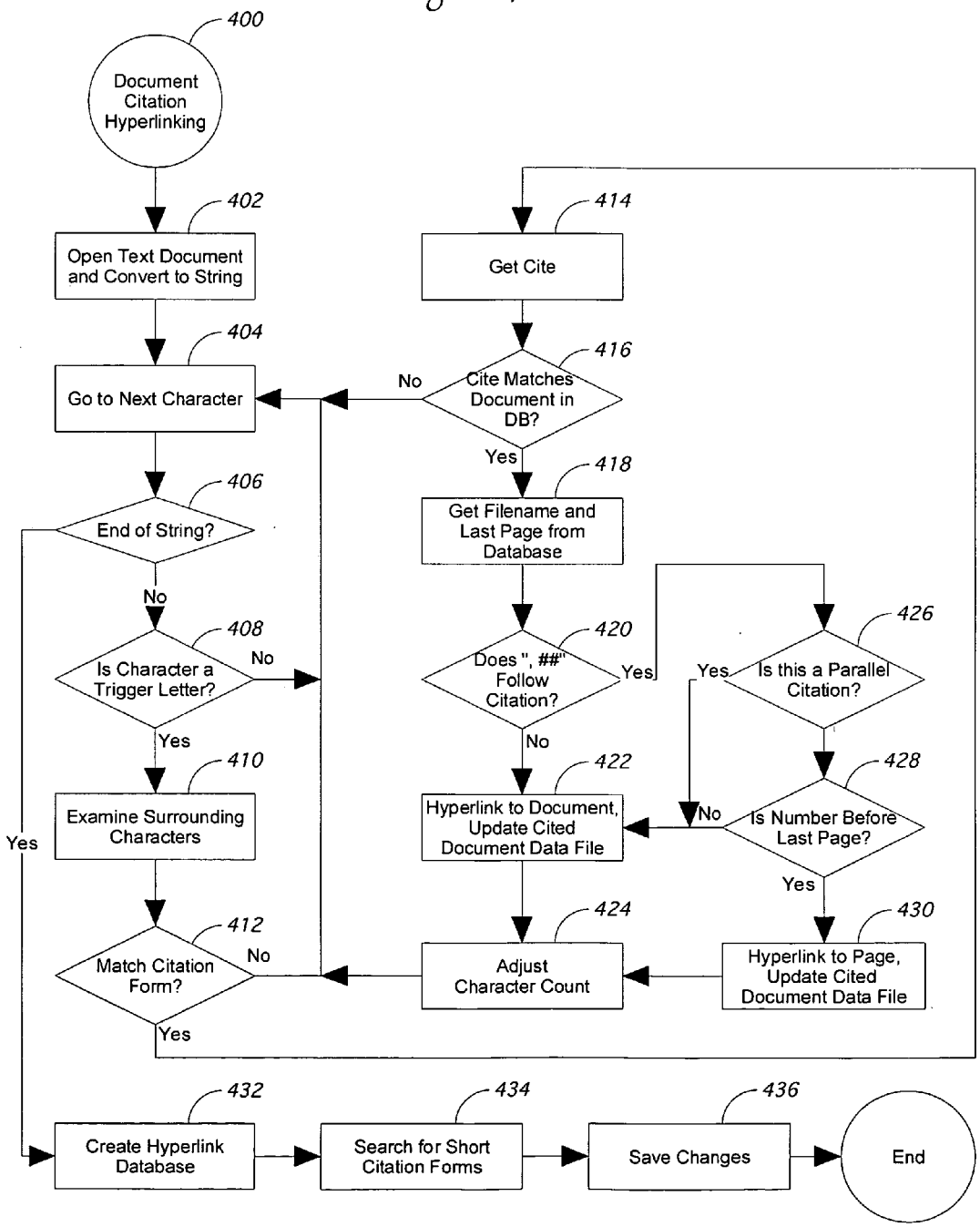
FIG. 4 is a flow chart showing the document citation hyperlinking process used by the present invention.

The database record is used by the present invention when it creates citation hyperlinks between two documents 10 in the system 1. The process 400 for doing so is shown in FIG. 4. This process begins by opening a document file 10 at step 402. A computer program of the present invention then parses the text, looking for patterns of letters and characters that suggest a full citation. In the preferred embodiment, this is accomplished by transforming the document into a single, long string (also in step 402) and then parsing the document character-by-character in step 404. There are other methods well-known in the art for parsing text.

If the end of the string is not detected at step 406, then the current character is analyzed at step 408 to determine if it could form part of a citation. In the legal context, citations to other legal opinions take well-known and predictable formats. For example, cases from the Virginia Supreme Court are cited in the form "222 Va. 194", where "222" is the number of the volume in the printed reporter series that contains the case, "Va." is the abbreviated name of the reporter series, and "194" is the page in the printed volume where the reported decision begins. Thus, to find citations to cases from the Virginia Supreme Court, the system 1 looks for the pattern "(Space)Va.(Space)". To find this citation format, the letter "V" is used as a trigger, since a citation must use this letter to specify the reporter name. The letter "V" could form a trigger for the Virginia Court of Appeals reporter, the West Virginia case reporters, as well as reporters from Vermont or the Virgin Islands. Of course, when examining documents from a variety of sources, many different letters will be considered trigger letters at step 408. For those characters that are not trigger letters, step 408 returns processing to step 404 and the next letter in the document 10 is analyzed.

If step 408 finds a trigger letter, step 410 will examine the characters surrounding the trigger letter to help determine whether the trigger letter actually forms part of a citation. For legal documents 10, the system 1 examines the letters surrounding the trigger letter to determine whether they form a legal reporter abbreviation, and then examines whether the "words" both preceding and following the pattern are composed of numbers. If not, then this is not a standard, "full" legal citation (which is determined at step 412), and processing continues with the next character at step 404.

If step 412 recognizes this as a potential citation, step 414 proceeds to understand the elements of the citation so that it can be used to query database 20 in step 416. This query determines whether the discovered citation relates to a text document 10 already in the system 1. If step 416 does not find such a match, then the citation does not reference a known document 10, and no hyperlink will be added for this citation. In this case, processing returns to step 404 to search for the next citation in the document.

While one would hope that every legal decision would have a unique citation, legal decisions sometimes have the same "full" citation. If one decision is extremely short, some publishers will begin another decision on the same printed page. Thus, after the database "look-up" is performed in step 416, a second look-up is done to determine if more than one document bears the same full citation. If so, the system alerts an administrator who is asked to determine which document is referenced by the citation.

If a match is found in step 416, that document's filename and last page field are retrieved from database 20 in step 418 and stored in memory. Next it is necessary to determine whether the discovered citation is a form of pinpoint citation. Particularly, whether the citation is in a form in which the pinpoint page number follows directly after the full citation to the case, e.g., "222 Va. 194, 198". In this, and other types of pin-point citations discussed herein, it often occurs that a page range is presented, such as "245-247" or "245-47" rather than a single page number. The present invention recognizes such cases by the hyphen, extracts the first and last pages of the range, determining the complete last page number when it has been foreshortened as in the second example above.

To determine whether the citation is a pin-point citation, step 420 determines if a comma and a number immediately follow the first discovered number following the reporter abbreviation in the citation. If not, the invention knows that there is no pinpoint citation to a particular page in a document, and step 422 adds a hyperlink to the entire cited document. In the preferred embodiment, the hyperlink to a non-pin-point citation takes the following format:

<a ref="[FILENAME]">222 VA.194</A>

As explained above, every citation to a source document is stored in the data file 30 associated with the source document, with a separate record for each citing document. Step 422 is responsible for updating the data file 30 by either creating a new record for the citing document or by adding the additional citation to an existing record. If the data file 30 were not automatically created earlier in the process, then step 422 would also be responsible for creating the data file 30.

Once the hyperlink is created in step 422, the process can return to step 404 to look for the next character. Optionally, step 424 can adjust the current character position in the string to account for all of the characters that have been incorporated into the current citation. That way characters that have already been analyzed do not need to be reanalyzed by steps 404-412.

If step 420 determines that the page number of the discovered citation is followed by a comma and another number, the second number may be the pinpoint page number of a pin-point citation. The next step 426 is to verify that the second number is a page number from a pinpoint citation, rather than the volume number in a parallel citation. A legal decision may appear in more than one reporter series, in which case, the preferred practice is to provide a citation to each reporter. The first citation is always to the "official" reporter and the second (and subsequent) citation is deemed a "parallel" citation. A comma immediately following a number identifies the number as a page number. Compare a parallel citation without a pin-point cite: "222 Va. 194, 361 S.E.2d 238" to a parallel citation with a pinpoint cite: "222 Va. 194, 198, 361 S.E.2d 238, 241". Step 426 can determine whether the second number is a pinpoint page number by determining whether the potential pinpoint page number is followed by a comma, or by whether the word following the potential pinpoint page number is another reporter abbreviation. If the citation is not a pinpoint cite, and step 422 is called to hyperlink to the entire cited document.

If step 426 verifies that the second number is a pinpoint page number, step 428 examines whether the potential pinpoint page number (or whether all of the page numbers within a range) falls between the first page number of the cited document and last page number of the cited document as determined in step 418. If not, then this is not a correct pinpoint citation, and step 422 is used to hyperlink to the entire document. If the pinpoint page number does fall within this range, step 430 creates a hyperlink to the pinpoint page or pages within the cited case. The format of this hyperlink is as follows:

<a ref="[FILENAME]#196>222 Va. 194, 196</a> where "196" is the pin-pointed page number. As was the case with step 422, step 430 also alters the data file 30 associated with the cited document 10 so as to add or alter a record that describes this pinpoint citation. At this point, the character count may be adjusted to skip all of the newly discovered pinpoint citation characters in step 424, and the next character is then analyzed in step 404.

When step 406 determines that the entire document 10 has been analyzed for full citations, it is necessary for process 400 to look for "short citation forms." This is because, even in the context of legal opinions, not all citations take the same general form. Short citation forms are generally acceptable when a citation is referring to a source that has previously been fully cited. For instance, pinpoint citations sometimes take the form in which the word "at" appears after the citation to the volume and reporter series, e.g., "222 Va. at 196." In addition, it is well known to refer to a previously cited source document by using an abbreviation for the Latin word Idem (meaning, "the same"), for example, "Id. at 45."

To look for these short citations form, step 432 creates a hyperlink database for the current document 10. To do so, step 432 parses through the text, counting each paragraph as encountered and finding the hyperlinks to cases. These hyperlinks are added as records in a temporary database (the "hyperlink database"). The record for each hyperlink has fields for the volume number, reporter name and first page number of the case (this data is derived from the full citation, which is retrieved from the master database), the last page number of the case (also retrieved from the master database), the pin-point page number (when applicable), the filename of the case (contained in the opening tag of the hyperlink), and the number of the paragraph in which the hyperlink was found.

Technically, the "hyperlink database" is a multi-dimensional array in memory. A multi-dimensional array is easily likened to a spreadsheet. Each "row" in the array contains several "columns" as follows:

| Volume | Reporter | First Page | Last Page | Pin-point | Filename | ¶ |
|---|---|---|---|---|---|---|
| 222 | Va. | 194 | 199 | | va_scp044194 | 5 |
| 222 | Va. | | | 196 | va_scp044194 | 7 |

In the hyperlink array of the preferred embodiment, only full citations have entries in the first page and last page fields, and only pinpoint citations have entries in the pinpoint field.

Next, step 434 examines the document 10 by looking for short citation forms. This step is accomplished by first searching for the sequence "(space)at(space)". When found, the first word preceding the sequence is examined to see if it is the abbreviated name of a reporter (such as "Va."). If so, then the word preceding the abbreviated reporter name is examined to see if it is composed entirely of numbers (in our example, "222"). If so, then the number represents the number of the volume in a reporter series that contains the cited case. The volume number and reporter name are compared to the entries in the hyperlink database. If a match is found in the hyperlink database, then the word after the "(space)at(space)" sequence is examined. If it is composed of numerical digits, it represents a page number (or a range of pages). If that page number (or the numbers in the range) falls within the range of the first and last page numbers entered in the previously-located record(s) of the hyperlink database, the parser has found a valid pin-point cite, so it is tagged in the document as in step 430 above, and information regarding the pin-point citation is added to the hyperlink database. As was the case previously, step 430 also alters the data file 30 associated with the cited document 10 so as to add or alter a record that describes this citation.

If desired, step 434 can search the text file 10 for additional forms of short citations, such as "Id. at 45." When the pattern "Id. at (number)" is found, the hyperlink database is examined to see if there are one or more pre-existing hyperlinks in the paragraph in which the pattern is found. If so, then the page number following "Id. at" is compared to the first and last page numbers for each element for this paragraph in the hyperlink database. At the option of the user, process 400 could also look at data for preceding paragraphs in the hyperlink database if the desired citation is not found in the records for the current paragraph. If the page number falls within the range, the "Id. at" cite is tagged, and information entered in data file 30, as explained above.

Technically, if every document that could be cited in the form "Id. at" is contained in the system, and if the authors of the documents 10 never made mistakes in using the "Id. at" cites, step 434 could obtain much of the information by looking at the immediately preceding citation in the text of the document. This is because, by convention, "Id. at" indicates that the material is being cited to the same source as set out immediately above, albeit, at a different page. Since it is unrealistic to rely upon either condition, step 434 tags only those instances where the reporter and volume matches a previously tagged citation in the same paragraph and the pinpoint page number falls within the range of the cited document.

In the preferred embodiment, step 434 searches for a third short citation form, namely un-tagged instances of the word "Id." When an un-tagged instance of "Id." is found, the system displays a generous portion of the surrounding text, highlighting the "Id.", and presents this text to an administrator. If the administrator determines that the "Id." is a valid cite, the administrator instructs the system to display a list of previously cited documents assembled from the information in the hyperlink database. From that list, the administrator selects the citation matching that to which the "Id." is referring, and edits the hyperlink if necessary. The system then adds the hyperlink to the "Id." citation. As noted, step 434 could automatically create the hyperlink for "Id." citations merely by using the immediately previous citation in the hyperlink database. However, the automatic process will be effective only if all citations in the document 10 have been previously hyperlinked, and if the author correctly utilized the "Id." citation. Because of these conditions, the preferred embodiment presents "Id." citations to the administrator for confirmation and editing.

Overview of Document Viewing

Figure 5:
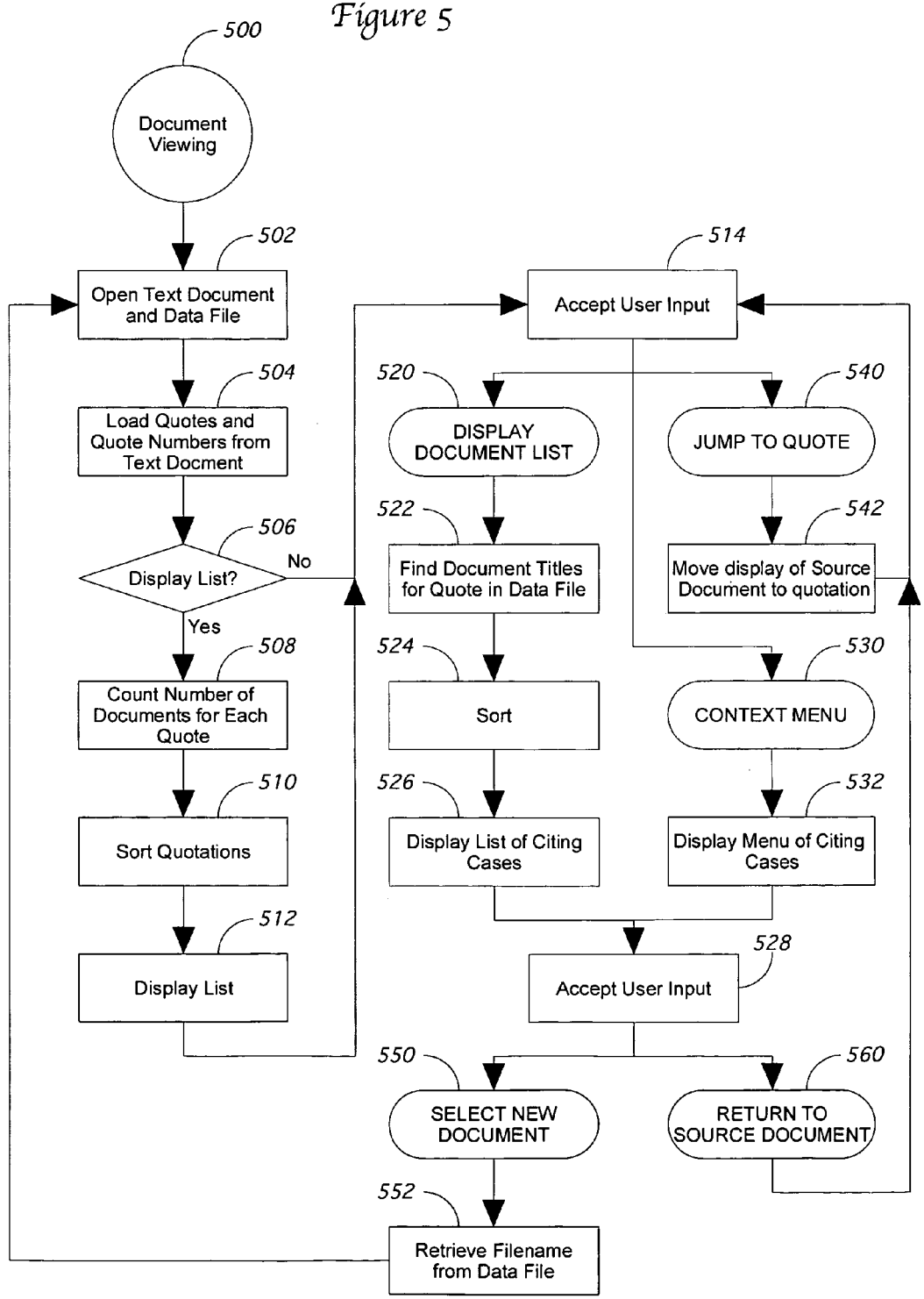
FIG. 5 is a flow chart showing the document viewing process used by the present invention.

FIG. 5 contains a flow chart 500 that summarizes the process by which the present invention displays a source document 100 for viewing. The process 500 begins at step 502 by opening the text file 10 for the source and its related data file 30. The text document 10 for the source is scanned for tags identifying items of quoted text in step 504. Each item of quoted text is stored in memory, along with the identifier assigned to such quoted material.

Step 506 is then used to determine whether list 110 of items of quoted text is to be displayed. In the preferred embodiment, this list is optional, and can be selected as a user preference. Assuming list 110 is to be displayed, the associated data file 30 is accessed and the total number of times each identified item was quoted by other documents is calculated and added to the record in memory for that item. Step 510 then sorts the list, such as by the total number of times each item was quoted. The list 110 is then displayed in step 512, which includes the text of each quotation.

At this point, the user is allowed to view and scroll through the source document 100. The system is able to accept user input during this viewing process, which is shown in the flowchart at step 514. This step 514 is also encountered if step 506 determines that the user has selected not to display the list of items of quoted text 110 at the beginning of the source document 100. In flow chart 500, there are only three options available to the user: to display document list 150 (choice 520), to display a contextual menu (choice 530), and to jump to specified quoted material 130 in the original source text 120 (choice 540). In actuality, the user may be presented with many options, such as the option to print the source document 100, to directly enter a citation to another document 10, or to quit the program. While these options are available to the user in the preferred embodiment, the options are not directly relevant to the present invention and therefore are not shown in FIG. 5.

At step 514, the user may select to display a list of documents 150 that quote a selected item of quoted text from the currently displayed source document 100 (selection 520). As shown in FIG. 2, this list can be accessed either from the list of items of quoted text 110 or from the highlighted item of quoted text in the original source text 120. To create this list 150, the process retrieves from the associated data file 30 the titles of all documents 10 that quote the selected item of quoted text. The titles may be the formal case title if the documents are legal opinions, or article titles if the documents are scholarly or news articles. The display of documents in the list 150 is preferably sorted by the number of times each document quoted the item of quoted text in step 524. Once sorted, the list 150 is displayed in step 526. The elements in list 150 may include only the title of the quoting documents 200, or could include the entire citation of the documents 200.

Once the list 150 is created and presented to the end user, the system 1 will await user input at step 528. In FIG. 5, two possible input choices are presented: select new document 550 or return to source document 560. The select new document choice indicates that the user desires to view one of the quoting documents 200 that were presented in the list 150. If this choice is made, the system 1 in step 552 retrieves the file name of the selected quoting document 200 from the data file 30 associated with the source document 100. At this point, the system 1 returns to step 502 with the quoting document 200 now being presented as the source document 100. If choice 560 is made, the system 1 returns to viewing the original source document 100 and awaits user input at step 514.

At step 514, it is possible for the user to select a contextual menu at choice 530. This is typically accomplished by clicking the right mouse button when the cursor is positioned on a word in the document. If this choice 530 is made, a list of quoting documents 200 that quote items of quoted text that include the selected word is presented to the user directly in the contextual menu at step 532. The user can then select one of these documents for viewing, or return to viewing the original source document 100. Since these options are the same as step 528 in the context of displaying a document list 520, the flow chart in FIG. 5 shows the system 1 moving to step 528 after displaying the contextual menu of quoting documents in step 532.

The last choice presented at step 514 is to jump directly to an item of quoted text in the original source text 120, which is choice 540. This choice is represented by hyperlink 112 in FIG. 2. When this choice 540 is made, the display of the source document 100 is altered to show the quoted text in the original source text 120, preferably with the quoted text presented in a unique color or other highlight. After updating the view of the source document 100, the flow chart returns to step 514 to await additional user input.

The present invention is not to be limited to all of the above details, as modifications and variations may be made without departing from the intent or scope of the invention. Consequently, the invention should not be limited by the specifics of the above description, but rather be limited only by the following claims and equivalent constructions.

What is claimed is:

1. A computerized method of presenting documents to an end user comprising:
    a) identifying in a source document, in a computerized system, at least one quoted text portion quoted by a quoting document, leaving a non-quoted text portion that was not quoted by any quoting document, wherein the quoted text portion and the non-quoted text portion both have a context in which each portion is found in the source document, and wherein the quoting document indicates that the source document is the source of the quote;
    b) storing in the computerized system, in association with the source document, the fact that the quoted text portion has been quoted by the quoting document along with the location of the quoted text portion in the source document;
    c) recalling the stored location of the quoted text portion when displaying the source document without accessing the quoting document;
    d) highlighting the quoted text portion, based on the stored location recalled in step c), during the display of the source document through a computerized interface to visually distinguish the quoted text portion as different than the non-quoted text portion, wherein a technique for the highlighting is selected from a set comprising changing a color of a font for displayed text, creating a different colored background for displayed text, and otherwise visually emphasizing the importance of displayed text;
    e) receiving a user selection of the quoted text portion; and
    f) displaying a list of quoting documents that quote the selected quoted text portion.

2. The method of claim 1, wherein the step of visually indicating the quoted text portion is accomplished by:

i) creating a list of all quoted text portions identified in the source document, and
ii) displaying the list of all quoted text portions outside of the context of the source document while also displaying the entire source document including the quoted text portions in context.

3. The method of claim 1, wherein the step of visually indicating the quoted text portion is accomplished by:
i) displaying in a first manner the non-quoted text portion within the context of the source document,
ii) displaying in a second manner the quoted text portion within the context of the source document, and
iii) the first and second manner of displaying being different to visually identify those portions of the source document that contain quoted text portions.

4. The method of claim 1, wherein the step of visually indicating the quoted text portion is accomplished by:
i) creating a list of all quoted text portions identified in the source document,
ii) displaying the list of all quoted text portions outside of the context of the source document,
iii) displaying in a first manner the non-quoted text portion within the context of the source document,
iv) displaying in a second manner the quoted text portion within the context of the source document, and
v) the first and second manner of displaying being different to visually identify those portions of the source document that contain quoted text portions.

5. The method of claim 1, wherein the source document is stored in a text file containing tags, wherein each quoted text portion is identified through quotation tags that contain a unique quotation identifier.

6. The method of claim 5, wherein a separate data file is associated with each text file.

7. The method of claim 6, wherein the data file contains a plurality of records, each record having information about one quoting document that quotes at least one of the quoted text portions in the original source text.

8. The method of claim 7, wherein the records contain the quotation identifiers used in the tags to identify the relevant quoted text portion.

9. The method of claim 1, wherein the list of quoting documents is displayed in a contextual menu.

10. The method of claim 1, further comprising:
g) allowing a user to select one of the quoting documents from the list of quoting documents;
h) displaying original source text for the selected one of the quoting documents.

11. The computerized method of claim 1, wherein the step of storing, in association with the source document, the fact that the quoted text portion has been quoted by the quoting document further comprises the step of storing, in association with the source document, an indication of the identity of the quoting document.

12. A computerized method of identifying an item of text in a source document quoted in a quoting document, the method comprising:
a) opening the quoting document that is stored on a tangible, non-transitory computer readable memory in a computer program operating on a computer;
b) searching, using the computer program operating on the computer, the quoting document for a quotation and identifying the item of text as the quotation;
c) determining the source document from text near the quotation in the quoting document;
d) opening the source document on the computer;
e) automatically locating the item of quoted text in the source document using the computer;
f) storing, on a tangible, non-transitory computer readable memory, information in a data construct associated with the source document indicating the fact that the item of quoted text within the source document has been quoted by the quoting document as well as the location of the item of quoted text within the source document;
g) when displaying the source document through a computer interface, recalling the stored location of the item of quoted text and highlighting the item of quoted text as different than other portions of the source document, wherein a technique for the highlighting is selected from a set comprising changing a color of a font for displayed text, creating a different colored background for displayed text, and otherwise visually emphasizing the importance of displayed text;
h) receiving, through the computer interface, a user selection of one of the items of quoted text in the source document; and
i) displaying, through the user interface, a list of quoting documents that quote the selected item of quoted text.

13. The method of claim 12, wherein the data construct consists of tags placed around the item of quoted text in the source document.

14. The method of claim 13, wherein the tags contain a unique identifier for the item of quoted text in the source document.

15. The method of claim 12, wherein the data construct is external to the source document and indicates the location of the item of quoted text using an offset from a known location in the source document.

16. The method of claim 12, further comprising: assigning a unique identifier for the item of quoted text in the source document.

17. The method of claim 16, further comprising: storing the unique identifier for the item of quoted text in the data construct.

18. The method of claim 17, further comprising: placing tags around the quotation in the quoting documents, the tag including the unique identifier for the quotation.

19. The method of claim 18, wherein the tags in the quoting document includes a document identifier for the source document.

20. The method of claim 16, further comprising: creating a data record associated with the source document, the data record containing the unique identifier for the quotation and a document identifier for the quoting document.

21. The method of claim 20, wherein the data record is stored in a data file associated with the source document.

22. The method of claim 21, wherein the data file and the source document are stored as separate files in a file system using unique filenames, and further wherein both the data file filename and the source document filename share a common text component indicative of the source document.

23. The method of claim 12, further comprising:
j) counting the number of items of quoted text tagged within the source document; and
k) using the count to sort documents returned in a search result set.

24. The method of claim 12, further comprising:
j) executing a user search based upon a search query;
k) returning the source document and at least one other found document in response to the search query;
l) comparing the item of quoted text in the source document with the search query;

m) using the results of the comparison in step i) to sort the source document and the found documents for presentation to a user.

25. The method of claim 12, further comprising:
   j) repeating steps a-f on a plurality of quoting documents and source documents to create a plurality of items of quoted text;
   k) indexing the plurality of items of quoted text for full-text searching;
   l) executing a full-text search on the items of quoted text without searching the source documents and the quoting documents; and
   m) returning in response to the full-text search the source documents related to the items of quoted text found in the full-text search.

26. A computerized system for storing information about quotations comprising:
   a) a plurality of electronically stored text documents stored on a tangible, computer readable medium, including a source document that contains an item of text and a first quoting document that quotes the item of text as a quotation originating from the source document;
   b) a computer-readable memory storing a data record, the data record being associated with the source document, the data record storing:
      i) the fact that the item of quoted text has been quoted by the quoting document,
      ii) the location of the quoted text within the source document,
      iii) a first quotation identifier for uniquely identifying the item of quoted text in the source document, and
      iv) a first document identifier uniquely identifying the first quoting document; and
   c) a processor programmed to:
      i) recall the data record associated with the source document when displaying the source document without accessing the quoting document,
      ii) highlight the item of quoted text during the display of the source document through a computerized interface, wherein a technique for the highlight is selected from a set comprising changing a color of a font for displayed text, creating a different colored background for displayed text, and otherwise visually emphasizing the importance of displayed text;
      iii) receive a user selection of the item of quoted text; and
      iv) display a list of quoting documents that quote the selected item of quoted text.

27. The system of claim 26, further comprising a second quoting document that quotes the item of text as a quotation originating from the source document, and further comprising a second record having the first quotation identifier and a second document identifier uniquely identifying the second quoting document.

28. The system of claim 26, wherein the data record is stored in a data file associated with the source document.

29. The system of claim 26, wherein the data record is stored within the source document text file.

30. The system of claim 26, wherein the source document contains tags surrounding the item of text, the tags containing the first quotation identifier.

31. A computerized method of searching documents comprising:
   a) identifying in a source document, using a computer system, at least one quoted text portion quoted by a quoting document, leaving a non-quoted text portion that was not quoted by any quoting document, wherein the quoting document indicates that the source document is the source of the quote;
   b) storing, on a tangible, non-transitory computer readable memory, information in a data construct independent from the quoting document indicating the fact that the quoted text portion has been quoted by the quoting document as well as the location of the quoted text portion within the source document;
   c) searching, using the computer system, a plurality of documents stored in a tangible, non-transitory computer readable memory, including the source document, in response to a search query; and
   d) sorting, using the computer system, the results of the searching step based in part on the information stored in the data construct indicating the fact that the quoted text portion has been quoted by the quoting document, wherein the sorting step further comprises
      i) counting the number of quoted text portions identified within the source document, and
      ii) using the count to sort the results of the searching step;
   e) displaying the source document through a computer interface while highlighting the quoted text portion, wherein a technique for the highlighting is selected from a set comprising changing a color of a font for displayed text, creating a different colored background for displayed text, and otherwise visually emphasizing the importance of displayed text;
   f) receiving, through the computer interface, a user selection of the quoted text portion; and
   g) displaying, through the computer interface, the quoting document in a list of quoting documents that quote the selected quoted text portion.

32. The method of claim 31, wherein the sorting step further comprises:
   i) comparing the quoted text portions in the source document with the search query;
   ii) using the results of the comparison in step i) to sort the results of the searching step.

33. A computerized method comprising:
   a) first, on a computerized system operating under the direction of computer software, opening a source document;
   b) second, on the computerized system, retrieving from a non-transitory, computer-readable memory a data construct for that source document, the data construct selected from a plurality of data constructs based on the opened source document, the data construct further indicating
      i) the fact that a first quoted text portion in the source document has been quoted by a first quoting document,
      ii) the fact that a second quoted text portion has been quoted by the second quoting document, and
      iii) the location of the first and second quoted text portions within the source document; and
   c) third, using the data construct on the computerized system to:
      i) identify in the source document the first quoted text portion and the second quoted text portion;
      ii) identify the first quoting document for the first quoted text portion, and the second quoting document for the second quoted text portion, wherein the first and second quoting documents are different documents each stored on a tangible, non-transitory computer readable memory;

iii) display the source document while highlighting the quoted text portions, wherein a technique for the highlighting is selected from a set comprising changing a color of a font for displayed text, creating a different colored background for displayed text, and otherwise visually emphasizing the importance of displayed text; and iv) receive a user selection of one of the quoted text portions and then display a list of quoting documents that quote the selected quoted text portion.

* * * * *